United States Patent [19]

Fuji et al.

[11] Patent Number: 4,993,012
[45] Date of Patent: Feb. 12, 1991

[54] RECORD FACE IDENTIFYING DEVICE FOR MAGNETO-OPTIC RECORD MEDIUM

[75] Inventors: Hiroshi Fuji; Tomiyuki Numata; Tsuneo Fujiwara, all of Tenri; Kentaroh Tsuji, Nara, all of Japan

[73] Assignee: Sharp Kabushiki Kaisha, Osaka, Japan

[21] Appl. No.: 201,908

[22] Filed: Jun. 3, 1988

[30] Foreign Application Priority Data

Jun. 5, 1987 [JP]   Japan ............................... 62-142086

[51] Int. Cl.⁵ ......................... G11B 7/00; G11B 11/14
[52] U.S. Cl. ..................................... 369/58; 360/114; 360/74.5; 369/13
[58] Field of Search ............... 369/13, 50, 52, 53, 369/54, 58; 365/122; 360/114, 74.5; 235/419, 375

[56] References Cited

U.S. PATENT DOCUMENTS 4,497,049  1/1985  d'Alayer de Costemore ... 369/54 X

FOREIGN PATENT DOCUMENTS 0156916  9/1985  European Pat. Off. .

OTHER PUBLICATIONS

Patent Abstracts of Japan; vol. 8; No. 245 (P-312) (1682) Nov. 10, 1984, & JP-A-59 119504 (Fujitsu K.K.) Jul. 10, 1984, the whole document.

*Primary Examiner*—Robert L. Richardson
*Attorney, Agent, or Firm*—Birch, Stewart, Kolasch & Birch

[57] ABSTRACT

A magneto-optic record signal processing system uses a linearly polarized light beam to be projected onto a magneto-optic medium and a recorded signal is reproduced by analyzing the polarized conditions of a reflected light beam from the medium. This processing system also includes a recording face identifying device for determining the recording face of the magneto-optic record medium. To determine the recording face, an initialized area projecting device projects a light beam onto an initialized area of a magneto-optic record medium. A transducing circuit then converts a slant in a polarization plane of a reflected light beam from the initialized area into a light intensity. A photo-detector detects the light intensity outputted from the transducing means and a comparator compares the output from the photo-detector with a reference level to determine the magnetization of the recording face.

14 Claims, 3 Drawing Sheets

RECORD FACE IDENTIFYING DEVICE FOR MAGNETO-OPTIC RECORD MEDIUM

BACKGROUND OF THE INVENTION

The present invention relates to a recording face identifying device used to detect an initialized direction of magnetization of a magneto-optic record medium such as an a magneto-optic disk to identify the recording face.

Recording and reproducing systems for magneto-optic disks will be briefly explained below. The magneto-optic disk is an optical magnetic record medium having a magnetic film on a disk substrate whose easy-axis of magnetization is in a direction perpendicular to the film surface. Recording, reproducing or erasing of information is performed by projecting a light beam focused to about 1 $\mu$m diameter by an objective lens onto the magneto-optic film surface on the disk.

To record information, a biasing magnetic field whose direction is reverse to an initialized direction of film magnetization is applied to the magnetic disk and the light beam which is intensity-modulated in response to a recorded signal is projected onto the film surface. Film portions projected by the intense light beam rise partially in temperature and the coercive forces of the portions are reduced. Therefore, the magnetized directions of the portions are reversed in the direction of the biasing magnetic field. Thus, magnetic recording corresponding to the intensity modulation of the recording signal can be effected.

To reproduce the recorded portions, the light beam is projected on the disk and its reflected beam is detected. The light beam is a linearly polarized laser beam with the polarized direction known. When such a light beam is projected onto the magnetized film, its reflected light beam produces a slant in the plane of polarization corresponding to a magnetized condition caused by a magneto-optic effect (Kerr effect). Therefore, the slant of the plane of polarization of the reflected light beam is detected by an analyzer and its output is transduced into an intensity of light and its intensity is detected by a photodetector. This enables the system to reproduce the recorded signal.

In practice, in order to enhance S/N, this reflected light beam is split into a P polarized light component and a S polarized light component which intersect at right angles. These two light intensities are detected by two photodetectors respectively. By determining a difference between these two outputs from the two photodetectors, the system can reproduce the recorded signal.

As mentioned above, a magneto-optic disk subjected to recording or reproducing of information is formed with magnetic films, normally, on both sides of the disk and information can be separately recorded on both sides of the disk, for example, A face and B face. Magnetizations of the films on A face and B face are initialized in the same direction, therefore, when loading the magneto-optic disk into a magneto-optic disk device, the initialized direction of magnetization viewed from the device side is reversed between A face setting and B face setting.

Therefore, when recording, the initialized direction of magnetization must be recognized and the biasing magnetic field must be applied in the reverse direction with respect to the magnetized direction.

In a conventional magneto-optic disk device, an identification mark for identifying A face and B face is provided on a cartridge case housing of the magneto-optic disk such that when loading the disk, the initialized direction of magnetization is recognized by mechanically detecting or electrically detecting this mark.

However, provision of such an identification mark on the cartridge case of the magneto-optic disk requires a separate detector used only for detecting the identification mark loading to increased costs.

Further, the initialized direction of magnetization has been indirectly detected by using such an identification mark, thereby rendering it difficult to know whether an indication of the identification mark on the cartridge case conforms with the real initialized direction of magnetization on the disk.

When using a magneto-optic disk having only one side magnetic film, the initialized direction of magnetization must be detected by the device unless the direction is standardized. Thus, in this case the mark indicating the initialized direction of magnetization on the cartridge case is also necessary. The same problem as that encountered in using a both sides magnetic film disk is found in a single-sided disk.

SUMMARY OF THE INVENTION

To solve the problems, the present invention embodies a novel type of record face identifying device for a magneto-optic record medium as described below.

According to the present invention, in a magneto-optic record signal processing system, in which a linearly polarized light beam is projected onto a magneto-optic record medium and a recorded signal is reproduced by using polarized conditions of a reflected light beam from the medium, the processing system includes a record face identifying device for the magneto-optic record medium comprises:

initialized area projecting means for projecting a light beam onto an initialized area of a magneto-optic record medium;

transducing means for converting a slant of a polarization plane of a reflected light beam from the initialized area into a light intensity;

photo-detecting means for detecting the light intensity outputted from the transducing means; and comparing means for comparing an output from the photo-detecting means with a reference level.

The initialized area is an area which stores the information concerning the initialized condition of magnetization after all information was recorded. The initialized area projecting means, is a control circuit which moves an optical head onto the initialized area to project a light beam thereon with an optical head drive control device when the optical head moves onto the magneto-optic disk such as seen in the magneto-optic disk device.

The reflected light beam from the initialized area produces a slant in a polarization plane corresponding to an initialized direction of magnetization. The transducing means, such as an analyzer, which picks up only one-directional slant component of the polarization plane, or an optical differential system which splits the reflected light beam into two rectangularly polarized components to pick up the slants in the polarization planes, is used.

The photo-detecting means can be a single photodetector when an transducer is used as an analyzer, and two photo-detectors are required when the optical differential system is used. When two photo-detectors are used as the photo-detecting means, the output of the photo-detecting means may be obtained from a difference between these two photo-detectors outputs by using a differential amplifier. When the photo-detecting means is a single photo-detector, or composed of two photo-detectors so that their difference output can be determined, the output of the photo-detecting means is compared with a predetermined reference level. When the photo-detecting means is two photo-detectors and the differential amplifier is not used, the output of one photo-detectors is defined as a reference level and the output of the other photo-detector may be compared with this reference level by the comparing means. Therefore, the comparing means outputs variant signals corresponding to the initialized direction of magnetization. The output of the comparing means thus obtained is used, for example, for determining the direction of a biasing magnetic field.

In another embodiment of the present invention, a magneto-optic record signal processing system in which a linearly polarized light beam is projected onto a magneto-optic record medium and a recorded signal is reproduced by using polarized conditions of a reflected light beam from the medium, the processing system includes a novel type of record face identifying device for the magneto-optic record medium, comprises:

initialized area projecting means for projecting a light beam onto an initialized area of a magneto-optic record medium;

transducing means for converting a slant in a polarization plane of a reflected light beam from the initialized area into a light intensity;

photo-detecting means for detecting the light intensity outputted from the transducing means; and comparing means for comparing an output from the photo-detecting means with a reference level.

This enables the device to directly detect the initialized direction of magnetization of the magneto-optic record media. Thus, using the record face identifying device of the present invention, an operator can use the magneto-optic recording device, free from the case, for both sides recording media or one side recording media without taking account of the standard of the recording media. Further, in place of the transducing means, photo-detecting means and comparing means, those equipped for reproducing the recorded signal can be used as they are, therefore, no separate detector and so on are required.

In addition, the initialized area projecting means is comprised of a control circuit which controls the optical head drive device and other control functions therefore, no new mechanical device is required. The record face identifying device for the magneto-optic record media of the present invention also reduces costs.

BRIEF DESCRIPTION OF THE DRAWINGS

The present invention will become more fully understood from the detailed description given below and the accompanying drawings which are given by way of illustration only, and thus are not limitative of the present invention and wherein:

FIG. 1 is a block diagram showing the identifying circuit using the analyzer;

FIG. 2 is a block diagram showing the identifying circuit using the optical differential system;

FIG. 3 is a graph showing the comparator output;

FIG. 4 is a graph showing the output of the photo-detector using the analyzer;

FIG. 5 (a), (b) are graphs showing the outputs of the photo-detectors using the optical differential system;

FIG. 6 is a partial longitudinal cross-section view showing the magneto-optic disk in the case of A face reproducing; and FIG. 7 is a partial longitudinal cross-section view showing the magneto-optic disk in the case of B face reproducing.

DESCRIPTION OF THE PREFERRED EMBODIMENT

Description of one embodiment of the present invention is given in accordance with FIG. 1 to FIG. 7 as follows.

A general explanation of a record face identifying device for a magneto-optic disk of a magneto-optic disk device is given first. This record face identifying device is comprised of an initialized area beam projecting device and an identifying device.

The initialized area beam projecting device initialized area beam projecting means, is contained in an optical head drive control device and moves the optical head to the initialized area of the magneto-optic disk to project a light beam onto the initialized area each time the magneto-optic disk is loaded.

Figure 6:
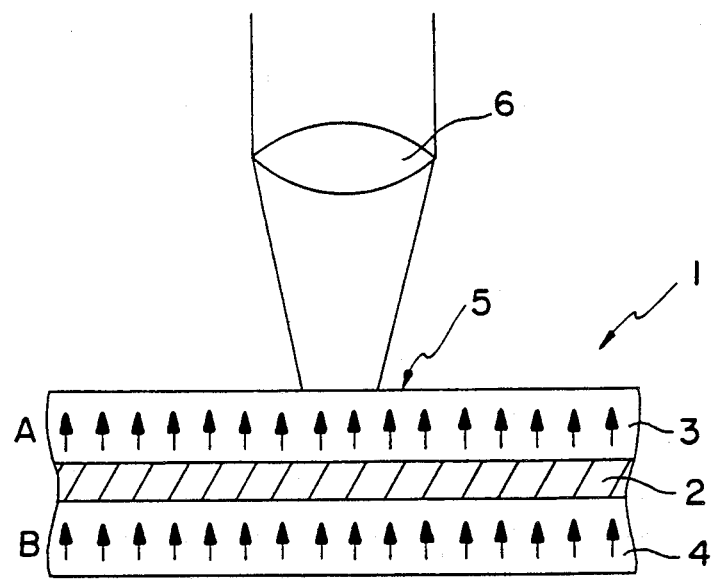
Figure 7:
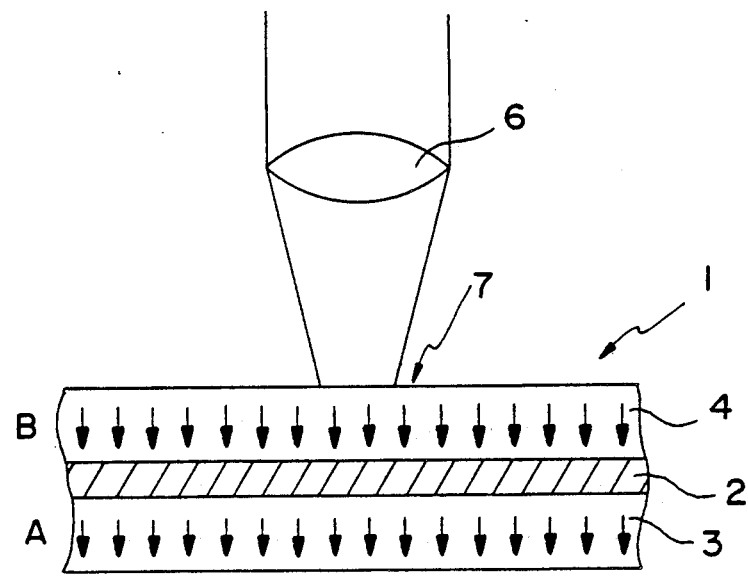

As shown in FIGS. 6 and 7, the magneto-optic disk 1 is formed with magnetic films 3 and 4 on both sides of the disk with a separation layer 2 therebetween to form A face and B face. The magnetic films 3 and 4 on the faces A and B are initialized so that magnetization may be generated in the same direction as shown by arrows in FIGS. 6 and 7.

When the magneto-optic disk 1 is loaded, with A face positioned for reproduction into the magneto-optic disk device, the initialized area beam projecting means moves the optical head to the initialized area 5 on the A face to focus the light beam onto the initialized area 5 with an objective lens 6 as shown in FIG. 6. In this case, a reflected light beam produces a slant is a polarization plane corresponding to the upward-directed magnetization owing to the upward A face.

And when the magneto-optic disk 1 is inserted, with B face positioned for reproduction, into the magnetic-optic disk device, the initialized area beam projecting means moves the optical head to the initialized area 7 on the B face to focus the light beam onto the initialized area 7 with the objective lens 6 as shown in FIG. 7. In this case, a reflected light beam is produced, opposite to the case of the A face, a slant in a polarization plane corresponding to the downward-directed magnetization owing to the upward B face.

Each initialized area 5 or 7 is not used for information storage and kept in the initialized state even when all the recording area of the magneto-optic disk 1 is used to record. Thus, when the light beam is focus onto the initialized area 5 or 7, its reflected beam is gathered in the optical head by the objective lens 6.

Figure 1:
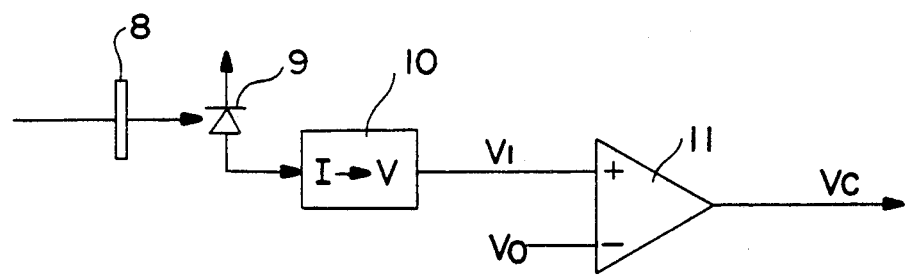
FIG. 1 to FIG. 7 show one embodiment of the present invention.

The identifying device utilizes the recording and reproducing portion in the conventional optical head. When an analyzer 8 is used as the transducing means, a photodiode 9 is located behind the analyzer 8 as shown in FIG. 1. The analyzer 8 is an optical system which picks up only one of the polarized components. The photodiode 9 is an element which converts the intensity of a received light into a magnitude of current. The output of the photodiode 9 is connected to a current-voltage transducer 10. The current-voltage transducer 10 is a circuit which transduces the value of an input current into a value of voltage. The output of this current-voltage transducer 10 is connected to an input of a comparator 11. The comparator 11 compares the input voltage $V_1$ with a reference voltage $V_0$ connected a reference voltage input terminal. When the voltage $V_1$ exceeds the reference voltage $V_0$, the comparator 11 outputs a digital signal of "H", and in other case, a digital signal of "L".

In the identifying device having the above circuit configuration, the reflected light beam from the initialized area 5 or 7 is transmitted to the analyzer 8 and the slant in the polarization plane is transduced into a light intensity. The light intensity transduced by the analyzer 8 is converted into a current magnitude by the photodiode 9 and transmitted to the current-voltage transducer 10.

Figure 4:
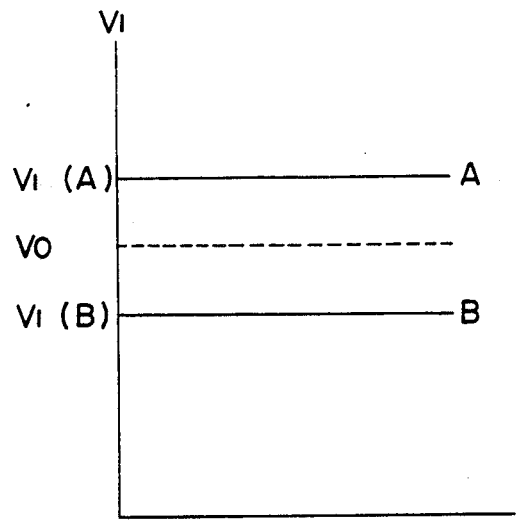

The current-voltage transducer 10 converts a current from the photodiode 9 into a voltage and this voltage, voltage $V_1$, is transmitted to the comparator 11. Because voltage $V_1$ has a voltage value corresponding to the slant is the polarization plane of the reflected light, the voltage $V_1$ (A) in the case of the A face initialized area 5 (upward-directed magnetization) is higher than the voltage $V_1$ (B) in the case of the B face initialized area 7 (downward-directed magnetization) as shown in FIG. 4.

Figure 3:
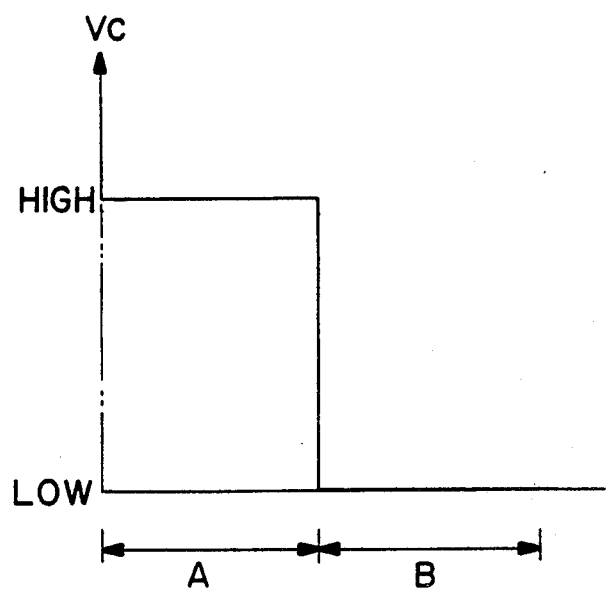

The comparator 11 outputs a digital signal representative of the initialized direction of magnetization by comparing this voltage $V_1$ with the reference voltage $V_0$. This reference voltage $V_0$ is set at the middle value between the comparing voltages $V_1$ (A) and $V_1$ (B) as shown in FIG. 4. Therefore, the output Vc of the comparator 11 becomes a digital signal of "H" in the case of the upward-directed magnetization and a digital signal of "L" in the case of the downward-directed magnetization as shown in FIG. 3. The output of this comparator 11 is transmitted to a control device not shown. When "H" is present, it is recognized that the A face of the optical magnetic disk is set, and when "L" is present, it recognized that the B face is set.

Figure 2:
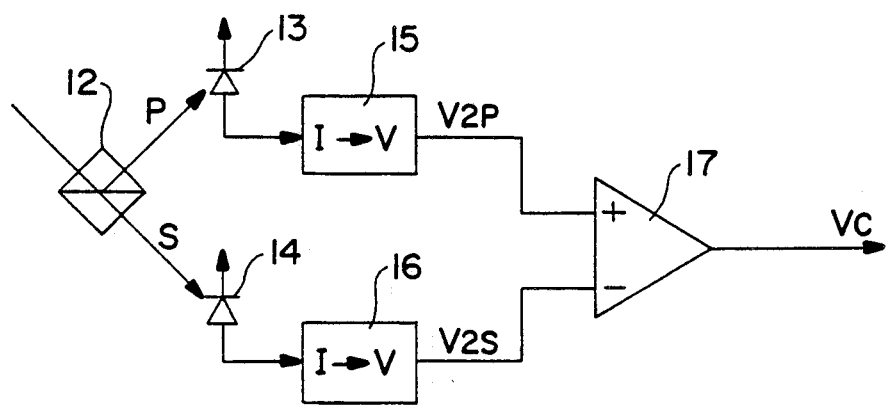

When an optical differential system 12 is used as the transducing means in the identifying system, two photo diodes 13 and 14 are located on each optical axis split by the optical differential system 12 as shown in FIG. 2.

The optical differential system 12 is a system which splits the reflected light beam into a P-polarized component and a S-polarized component whose optical axes intersect at right angles.

The outputs of the photodiodes 13 and 14 are connected to current-voltage transducers 15 and 16 respectively. The outputs of the current-voltage transducers 15 and 16 are connected to two input terminals of a comparator 17, respectively. The comparator 17 is a circuit which compares output voltage $V_{2s}$ of the current-voltage transducer 16 with output voltage $V_{2p}$ of the transducer 15, and outputs a digital signal of "H" when the output voltage $V_{2p}$ exceeds the output voltage $V_{2s}$ and a digital signal of "L" in other case.

The identifying device having the above circuit configuration transmits the reflected light beam from the initialized area 5 or 7 to the optical differential system 12 to split it into the P-polarized component and S-polarized component. When the reflected light beam is split into the polarized components whose optical axes intersect at right angles in this manner, these components are converted into light intensities which vary in reverse directions of each other depending on the slant in the polarization plane. The P-polarized component and S-polarized component split by the optical differential system 12 are converted into magnitudes of current by the photodiodes 13 and 14, respectively, and transmitted to the current-voltage transducers 15 and 16.

Figure 5A:
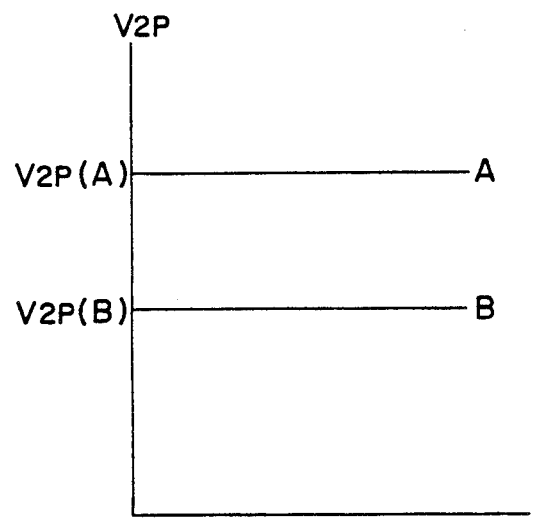
Figure 5B:
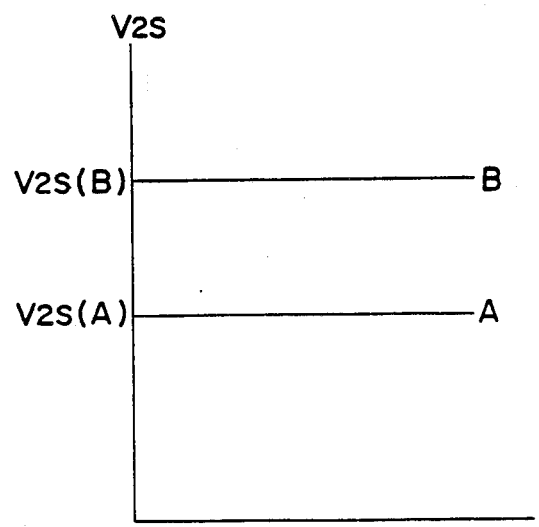

The current-voltage transducers 15 and 16 convert currents from the photodiodes 13 and 14 into voltages, that is, output voltages $V_{2p}$ and $V_{2s}$. These voltages are inputted into the comparator 17. The voltage $V_{sp}$ (A) in the case of the A face initialized area 5 (upward-directed magnetization) is higher than the voltage $V_{2p}$ (B) in the case of the B face initialized are 7 (downward-directed magnetization) as shown in FIG. 5 (a). Further, because high and low relation of the output voltage $V_{2s}$ signal level is reversed as compared with $V_{2p}$, the voltage $V_{2s}$ (B) in the case of the B face initialized area 7 (downward-directed magnetization) is higher than the voltage $V_{2s}$ (A) in the case of the A face initialized area 5 (upward-directed magnetization) as shown in FIG. 5 (b).

The comparator 17 outputs a digital signal representative of the initialized direction of magnetization by comparing the output voltage $V_{2p}$ with the output voltage $V_{2s}$. Therefore, as shown in FIG. 3, the output Vc of the comparator 17 becomes a digital signal of "H" in the case of the A face set in addition to the upward-directed magnetization, or a digital signals of "L" in the case of the B face set and the downward-directed magnetization. Therefore, the same result is obtained as that attained from the identifying device of FIG. 1. Thus, when the slant in the polarization plane is detected, use of such an optical differential system 12 allows the system to obtain a result that is substantially not affected by noise.

Further, when such an optical differential system 12 is used, the output voltages $V_{2p}$ and $V_{2s}$ from the current-voltage transducers 15 and 16 may be inputted into a differential amplifier and an output therefrom may be inputted into the comparing input of the comparator 11 of FIG. 1.

In this embodiment, a record face identifying device for identifying the A face and B face of the magneto-optic disk is explained, however even if a magneto-optic disk with only one recording face is used, this device can also be applied to identify the initialized direction. In this embodiment, the record face identifying device for magneto-optic disks is described, but the present invention can be applied to other embodiments which can be used for other magneto-optic recording media such as magnetic cards besides the magneto-optic disks.

While only certain embodiments of the present invention have been described, it will be apparent to those skilled in the art that various changes and modifications may be made therein without departing from the spirit and scope of the present invention as claimed.

What is claimed is:

1. In a magneto-optic recorded signal processing system in which a linearly polarized light beam is projected onto a magneto-optic recording medium and a recorded signal is reproduced by using polarized conditions of a reflected light beam from the recording medium, the processing system includes a recording face identifying device for identifying the magnetization of the recording face of the magneto-optic recording medium, comprising:

initialized area projecting means for projecting a light beam onto an initialized area of a magneto-optic recording medium;

transducing means for converting a slant in a polarization plane of a light beam reflected from said initialized area into a light having an intensity related to said slant;

photo-detecting means, operatively connected to said transducing means, for detecting said intensity of said light outputted from said transducing means;

comparing means, operatively connected to said photo-detecting means, for comparing an output from said photo-detecting means with a reference level, thereby determining the magnetization of the recording face.

2. The magneto-optic recorded signal processing system as claimed in claim 1, wherein said transducing means is an analyzer which converts only one polarized component of the reflected light beam into said light having said intensity.

3. The magneto-optic recorded signal processing system as claimed in claim 2, wherein said photo-detecting means comprises:

photodiode means for converting said intensity of said light into a current value; and current-voltage transducing means, operatively connected to said photodiode means, for converting said current value into a voltage value;

said comparing means comparing said voltage value with a reference voltage level.

4. The magneto-optic recorded signal processing system, as claimed in claim 1, wherein said initialized area projecting means are optical heads used in normal reproducing operations.

5. The magneto-optic recorded signal processing system in which a linearly polarized light is projected onto a magneto-optic recording medium and a recorded signal is reproduced by using polarized conditions of a reflected light beam from the recording medium, the processing system includes a recording face identifying device for identifying the magnetization of the recording face of the magneto-optic recording medium, comprising:

initialized area projecting means for projecting a light beam onto an initialized area of a magneto-optic recording medium;

beam splitting means for splitting a light beam reflected from said initialized area into a P-polarized component and a S-polarized component;

converter means for converting said P-polarized component into a first light having a first intensity related to a slant in a polarization plane of said P-polarized component and for converting said S-polarized component into a second light having a second intensity related to a slant in polarization plane of said S-polarized component;

photo-detecting means, operatively connected to said converting means, for detecting said first intensity of said first light to produce a first output and for detecting said second intensity of said second light to produce a second output; and comparing means, operatively connected to said photo-detecting means, for comparing said first output with said second output, thereby determining the magnetization of the recording face.

6. The magneto-optic recorded signal processing system as claimed in claim 5, wherein said photo-detecting means comprises:

first photodiode means for converting said first intensity of said first light into a first current value;

second photodiode means for converting said second intensity of said second light into a second current value;

first current to voltage transducing means, operatively connected to said first photodiode means, for converting said first current value into a first voltage; and second current to voltage transducing means, operatively connected to said second photodiode means, for converting said second current value into a second voltage;

said comparing means comparing said first voltage to said second voltage.

7. The magneto-optic recorded signal processing system as claimed in claim 5, wherein said initialized area projecting means are optical heads used in normal reproducing operations.

8. A method for determining a magnetization of a recording face of a magneto-optic recording medium utilizing a magneto-optic recording/reproducing apparatus comprising the steps of:

(a) projecting a focused light beam from a light source onto a pre-initialized area of a magneto-optic recording medium;

(b) receiving a reflection of the focused beam from the pre-initialized area;

(c) converting the reflected light into a light having a certain intensity, the intensity being related to a slant in a polarization plane of the reflected light;

(d) detecting the intensity of the light produced in said step (c);

(e) producing an output according to the intensity detected in said step (d); and (f) determining a magnetization of the recording face according to the output produced in said step (e).

9. The method as claimed in claim 8, wherein said step (c) converts only one polarized component of the reflected light.

10. The method as claimed in claim 9, wherein said step (e) comprises the steps of:

(g) producing a current value according to the intensity detected in said step (d); and (h) converting the current value of said step (g) to a voltage value; wherein said step (f) determines the magnetization of the recording face by comparing the voltage value of said step (h) with a reference value.

11. The method as claimed in claim 9, wherein said step (e) comprises the step of:

(g) producing a voltage value according to the intensity detected in said step (d); wherein said step (f) determines the magnetization of the recording face by comparing the voltage value of said step (g) with a reference value.

12. The method as claimed in claim 8, wherein said step (c) converts a P-polarized component of the reflected light into a first intensity and converts a S-polarized component of the reflected light into a second intensity.

13. The method as claimed in claim 12, wherein said step (d) detects the first and second intensities and wherein said step (e) comprises the steps of:

(g) producing a first current value according to the first intensity detected in said step (d);

(h) producing a second current value according to the second intensity detected in said step (d);

(i) converting the first current value into a first voltage value; and (j) converting the second current value into a second voltage value; wherein said step (f) determines the magnetization of the recording face by comparing the first voltage value with the second voltage value.

14. The method as claimed in claim 12, wherein said step (d) detects the first and second intensities and wherein said step (e) comprises the steps of:

(g) producing a first voltage value according to the first intensity detected in said step (d); and (h) producing a second voltage value according to the second intensity detected in said step (d); wherein said step (f) determines the magnetization of the recording face by comparing the first voltage value with the second voltage value.

* * * * *

UNITED STATES PATENT AND TRADEMARK OFFICE
CERTIFICATE OF CORRECTION

PATENT NO.   : 4,993,012
DATED        : February 12, 1991
INVENTOR(S)  : Hiroshi FUJI, Tomiyuki NUMATA, Tsuneo FUJIWARA, Kentaroh TSUJI, Takashi IWAKI & Toshihisa DEGUCHI It is certified that error appears in the above-identified patent and that said Letters Patent is hereby corrected as shown below: ON TITLE PAGE:

In Section 75 Inventors: Please add the names:

Takashi IWAKI, Nara-ken, Japan

Toshihisa DEGUCHI, Nara-ken Japan

Signed and Sealed this

Fifteenth Day of September, 1992

Attest:

DOUGLAS B. COMER

Attesting Officer

Acting Commissioner of Patents and Trademarks